Patented Oct. 23, 1928.

1,688,755

UNITED STATES PATENT OFFICE.

WINFIELD SCOTT, OF AKRON, OHIO, ASSIGNOR TO THE RUBBER SERVICE LABORATORIES CO., OF AKRON, OHIO, A CORPORATION OF OHIO.

PROCESS OF PRODUCING VULCANIZED RUBBER AND PRODUCT THEREOF.

No Drawing.   Application filed February 17, 1925. Serial No. 9,796.

My present invention is directed to the art of vulcanizing rubber and similar substances by the aid and in the presence of a new type of compounds as accelerators of the vulcanization process. More particularly, my invention is directed to the use in the rubber vulcanization process, of compounds possessing a plurality of functions, and having the property of imparting a number of desirable characteristics to the vulcanized rubber product.

My invention is specifically directed to the use in rubber compounds of substances which very materially accelerate the vulcanization process, and impart very desirable and characteristic age resisting properties to the vulcanized product.

It is well known to rubber chemists that the use of certain compounds in a rubber mix, and particularly of some of those compounds classified by chemists among the so-called organic compounds, is pratically precluded, because of the fact that the presence of even comparatively small quantities of these substances in rubber, apparently causes or aids in causing a comparatively rapid deterioration of the vulcanized product.

It is well known to rubber chemists that such compounds age badly. The rubber product becomes hard and loses a large part of its resiliency, while other characteristics, such as the tensile strength of the product are very detrimentally affected. In order for any accelerator to be of commercial value, it should then, not only be effective in shortening the time required for the vulcanization of the rubber, but, what is of even greater importance, it should not have any harmful or detrimental effect on the vulcanized rubber compound during the life of the product.

Accelerators of this type which may be termed anti-oxidants, in that they apparently inhibit the oxidation, or natural ageing of the vulcanized product, may be employed to produce rubber products, which I have chosen to refer to as age-resisting compounds, one class of which has been fully described and claimed in my co-pending application, Serial Number 751,200, filed Nov. 20, 1924, of which the present invention is a continuation in part. The accelerators disclosed in my prior application comprise compounds obtained by the interaction of an organic base with an aromatic hydroxy compound. Such an accelerator may be produced, for example, by the interaction of piperidine and hydroquinone.

I have now further found that hydroquinone or other of the polyhydroxy-benzenes, as well as many of their derivatives can be combined with guanidine and its derivatives, and particularly with the di-substituted guanidines, such as diphenyl-guanidine and di-o-tolyl-guanidine. The reaction between these materials may be very readily carried out at ordinary temperatures by combining, for example, equi-molecular proportions of hydroquinone and di-phenyl-guanidine, preferably in the presence of a solvent such as ether, benzene or the like. By employing the substances specified, and in the manner as set forth, the di-phenyl-guanidine-hydroquinone reaction product is obtained which is stable when dry, and which possesses desirable properties as an anti-oxidant and age-resistant accelerator of the vulcanization of rubber. Other similar compounds possessing equally desirable properties may be obtained by reacting guanidine or its aryl derivatives such as di-o-tolyl-guanidine and the like, with various di- and tri-hydroxy benzenes or any desirable derivatives of these compounds which possess properties similar to those of the substances specifically mentioned. Thus, in place of hydroquinone, I may substitute such of its derivatives as the tolu- or xylyl-hydroquinones and the like, or their ethers the mono and di-halogen- hydroquinones, and other analogous substances.

The various compounds hereinbefore mentioned resulting from the interaction of hydroquinone or its derivatives with guanidine or its derivatives, may be used in the manufacture of many different types of rubber compounds, of which the following is given as a very general and typical example. To 100 parts of smoked sheet rubber, broken down or plasticized in the usual well known manner on the differential rubber mixing mills, there are added 5 parts of zinc oxide, 3.5 parts of sulfur, and 0.75 parts of any of the compounds resulting from the interaction of the various materials set forth, for example, the di-phenyl-guanidine-hydroquinone reaction product. Samples of the rubber compound so prepared, were then vulcanized in the usual manner by heating for from 30 minutes to an hour in molds under a pressure of 40 pounds of steam per square inch. Some of the vulcanized rubber compound so obtained was tested and compared with other similarly prepared and cured compounds which was additionally subjected to an artificial ageing test by heating the compound for a period of 16 hours at a temperature of 70° C. under a pressure of 300 pounds of oxygen. The comparative results follow:

| Time of cure | Temperature of cure | Modulus at— | | | Tensile at break | Per cent elongation |
|---|---|---|---|---|---|---|
| | | 300% | 500% | 700% | | |
| | °C. | | | | | |
| Not aged 30 minutes | 141 | 163 | 334 | 1,150 | 2,585 | 840 |
| 45 minutes | 141 | 202 | 445 | 1,675 | 2,980 | 815 |
| 60 minutes | 141 | 222 | 516 | 1,838 | 3,300 | 805 |
| Rubber compound. | | | | | | |
| Aged 30 minutes | 141 | 172 | 411 | 1,375 | 2,645 | 830 |
| 60 minutes | 141 | 262 | 663 | 2,400 | 3,345 | 770 |
| Rubber compound. | | | | | | |

It is to be noted that by employing my new and preferred type of compounds as an accelerator, an actual improvement in the physical properties of the vulcanized product is realized in what corresponds to approximately two years of natural ageing. This is evidenced in the above table by the higher modulus of the artificially aged product at the intermediate elongations, as well as by the higher tensile strength at break. The great value of this type of accelerator is then shown in that an increase in the essential qualities of the vulcanized product is realized, instead of a very great decrease in these qualities as would ordinarily be anticipated in a test of this type and of this severity.

Other accelerators of this same type prepared by the use of guanidine or its derivatives either in the manner described or by other methods and used in the same rubber compound or in others as are apparent to those skilled in the art have shown equally desirable properties. I do not, then, limit my claims to any specific method of preparation of the type of compounds mentioned nor to any definite amounts of these accelerating and age resisting compounds in the rubber mix as such factors will, of course, vary somewhat depending on the ingredients used in the preparation of the compounds or with the various compounding ingredients which may be used in the rubber mix. Nor do I limit my invention to any theories or statements advanced by way of explanation but I do limit my invention solely by the claims appended hereto and made a part of this specification and in which I intend to claim my invention as broadly as is permissible in view of the prior art.

What I claim is:

1. The process of producing vulcanized rubber possessing age resistant characteristics which comprises heating rubber and sulfur in the presence of a compound obtained by reacting guanidine and a hydroxy-derivative of benzene.

2. The process of producing vulcanized rubber possessing age resistant characteristics which comprises heating rubber and sulfur in the presence of a compound obtained by reacting a derivative of guanidine and a hydroxy-derivative of benzene.

3. The process of producing vulcanized rubber possessing age resistant characteristics which comprises heating rubber and sulfur in the presence of a compound obtained by reacting a phenyl derivative of guanidine and a hydroxy-derivative of benzene.

4. The process of producing vulcanized rubber possessing age resistant characteristics which comprises heating rubber and sulfur in the presence of a compound obtained by reacting di-phenyl-guanidine with a poly-hydroxy-benzene.

5. The process of producing vulcanized rubber possessing age resistant characteristics which comprises heating rubber and sulfur in the presence of a compound obtained by reacting di-phenyl-guanidine with hydroquinone.

6. An age resisting rubber product comprising the vulcanization product of rubber, sulfur and the compound obtained by interacting guanidine and a hydroxy derivative of benzene.

7. An age resisting rubber product comprising the vulcanization product of rubber, sulfur and the compound obtained by interacting a guanidine derivative and a hydroxy derivative of benzene.

8. An age resisting rubber product comprising the vulcanization product of rubber, sulfur and the compound obtained by interacting a phenyl derivative of guanidine and a hydroxy derivative of benzene.

9. An age resisting rubber product comprising the vulcanization product of rubber, sulfur and the compound obtained by interacting di-phenyl-guanidine and a polyhydroxy-benzene.

10. An age resisting rubber product comprising the vulcanization product of rubber, sulfur and the compound obtained by interacting di-phenyl-guanidine and hydroquinone.

11. The process of producing vulcanized rubber possessing age resistant characteristics which comprises heating rubber and sulphur in the presence of a compound obtained by reacting di-phenyl-guanidine with equal molecular proportions of hydroquinone.

12. The process of producing vulcanized rubber possessing age resistant characteristics which comprises heating rubber and sulphur in the presence of a compound obtained by reacting an aryl substituted guanidine with hydroquinone.

13. The process of producing vulcanized rubber possessing age resistant characteristics which comprises heating rubber and sulphur in the presence of a compound obtained by reacting a di-aryl substituted guanidine with a poly-hydroxy-benzene.

14. An age resisting rubber product comprising the vulcanization product of rubber, sulphur and the compound obtained by interacting di-phenyl guanidine with equal molecular proportions of hydroquinone.

15. An age resisting rubber product comprising the vulcanization product of rubber, sulphur and the compound obtained by interacting an aryl substituted guanidine with hydroquinone.

16. An age resisting rubber product comprising the vulcanization product of rubber, sulphur and the compound obtained by interacting a di-aryl substituted guanidine with a poly-hydroxy-benzene.

In testimony whereof I affix my signature.

WINFIELD SCOTT.